United States Patent
Seo et al.

(10) Patent No.: US 9,338,366 B2
(45) Date of Patent: May 10, 2016

(54) APPARATUS AND METHOD FOR COMPENSATING FOR BACK LIGHT OF IMAGE

(71) Applicant: Samsung Electronics Co., Ltd., Gyeonggi-do (KR)

(72) Inventors: Ja-Won Seo, Gyeonggi-do (KR); Hae-Sun Lee, Seoul (KR); Jong-Hyub Lee, Gyeongsangbuk-do (KR); Sung-Jun Yim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/598,766

(22) Filed: Jan. 16, 2015

(65) Prior Publication Data
US 2015/0124159 A1    May 7, 2015

Related U.S. Application Data

(63) Continuation of application No. 12/872,550, filed on Aug. 31, 2010, now Pat. No. 8,957,990.

(30) Foreign Application Priority Data

Sep. 4, 2009    (KR) .......................... 10-2009-0083622

(51) Int. Cl.
 H04N 5/235    (2006.01)
 H04N 5/232    (2006.01)
 H04N 5/243    (2006.01)
(52) U.S. Cl.
 CPC ......... H04N 5/2351 (2013.01); H04N 5/23229 (2013.01); H04N 5/243 (2013.01)

(58) Field of Classification Search
 CPC ............................ H04N 5/235; H04N 5/2351
 See application file for complete search history.

(56) References Cited

U.S. PATENT DOCUMENTS

| 6,690,424 | B1 | 2/2004 | Hanagata et al. |
| 7,982,807 | B2 * | 7/2011 | Chen .................... H04N 5/2351 348/687 |

(Continued)

FOREIGN PATENT DOCUMENTS

| KR | 10-1999-0016228 | 3/1999 |
| KR | 10-2000-0001782 | 1/2000 |
| KR | 10-2008-0000236 | 1/2008 |
| KR | 10-2008-0047190 | 5/2008 |

OTHER PUBLICATIONS

Suji Shimizu et al., "A New Algorithm for Exposure Control Based on Fuzzy Logic for Video Cameras", IEEE Transactions on Consumer Electronics, Aug. 1, 1992.

(Continued)

*Primary Examiner* — Ahmed A Berhan
(74) *Attorney, Agent, or Firm* — The Farrell Law Firm, P.C.

(57) ABSTRACT

An apparatus and method for compensating for back light of an image are provided. The method includes receiving an image at a preset time interval, upon receiving the image, dividing pixels constituting the received image according to preset ranges, determining whether the received image is a back light image by confirming a distribution degree of pixels of each of the divided ranges, adjusting the brightness of the back light image when the received image is the back light image, and storing the received image and the back light compensated image.

19 Claims, 7 Drawing Sheets

(56) References Cited

U.S. PATENT DOCUMENTS

| | | | |
|---|---|---|---|
| 7,990,465 B2 * | 8/2011 | Yamashita | G03B 7/091 348/255 |
| 8,035,727 B2 * | 10/2011 | Okamoto | H04N 5/2352 348/362 |
| 2008/0074510 A1 * | 3/2008 | Chen | 348/234 |
| 2008/0111913 A1 | 5/2008 | Okamoto | |

OTHER PUBLICATIONS

Chiun-Li Chin et al., "Detection and Compensation Algorithm for Backlight Images with Fuzzy Logic and Adaptive Compensation Curve", International Journal of Pattern Recognition and Artificial Intelligence, Dec. 1, 2005.

* cited by examiner

APPARATUS AND METHOD FOR COMPENSATING FOR BACK LIGHT OF IMAGE

PRIORITY

This application is a continuation application of U.S. patent application Ser. No. 12/872,550, which was filed on Aug. 31, 2010 and claims priority under 35 U.S.C. §119(a) to a Korean Patent Application filed in the Korean Intellectual Property Office on Sep. 4, 2009, and assigned Serial No. 10-2009-0083622, the entire disclosure of which is hereby incorporated by reference.

BACKGROUND OF THE INVENTION

1. Field of the Invention

The present invention relates generally to a photographing apparatus such as a camera, and more particularly, to an apparatus and method for detecting back light of an image and compensating for the back light therein.

2. Description of the Related Art

Various digital image processing devices, e.g., a digital camera, photograph and record images of a subject using an image sensor, such as a Charge Coupled Device (CCD) or a Complementary Metal Oxide Semiconductor (CMOS), which converts light entered through a lens into electric signals.

When photographing a subject, if there is an external light source, such as natural light or a lamp, around the subject, the external light source often creates back light which prevents capturing a bright and clear image, while photographing the subject. Back light occurs when a subject stands with a light source behind the subject and a photographer faces the light source. If there is back light while photographing a subject, a captured image of the subject is often blurry and/or dark due to light that entered directly into a digital image processing device from the back of the subject, in addition to light reflected from the subject.

To solve this type of back light problem, a digital image processing device may include a back light compensation function. The back light compensation function reduces that effect of an external light source and other interference with respect to a subject, in order to provide clearer picture quality of the subject.

As one example, a digital image processing device may recognize the presence of back light, and turn on a flash or control an appropriate exposure value while photographing the subject, in order to obtain a clearer image of the subject.

However, in this type of method, a user should manually set a back light compensation function suitable for an ambient environment of the subject. Therefore, if the back light compensation function suitable for a specific environment is not set, the back light compensation function is not correctly applied and an optimal image cannot be acquired. Moreover, because the back light compensation function suitable for the ambient environment of the subject is manually set, a user should reset the back light compensation function every time an ambient environment is changed.

SUMMARY OF THE INVENTION

The present invention is designed to address at least the above-mentioned problems and/or disadvantages and to provide at least the advantages described below. Accordingly, an aspect of the present invention provides an apparatus and method for automatically compensating for image back lighting through a camera photographing an image.

In accordance with an aspect of the present invention, an apparatus for compensating for back light of an image is provided. The apparatus includes a camera including a camera lens for receiving an image at a preset time interval, an image processor for dividing pixels included in the received image according to preset ranges, confirming a distribution degree of pixels of each of the divided ranges, determining whether the received image is a back light image, and adjusting the brightness of the back light image when the received image is the back light image, and a storage unit for storing the received image and the back light compensated image.

In accordance with another aspect of the present invention, a method for compensating for back lighting of an image is provided. The method includes receiving an image, dividing pixels included in the received image according to preset ranges, determining whether the received image is a back light image by confirming a distribution degree of pixels of each of the divided ranges, adjusting a brightness of the back light image, when the received image is the back light image, and storing the received image and the back light compensated image.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will now be described in detail with reference to the accompanying drawings. The following detailed description includes specific details in order to provide a thorough understanding of the present invention. However, it will be apparent to those skilled in the art that the present invention may be practiced without such specific details.

Figure 1:
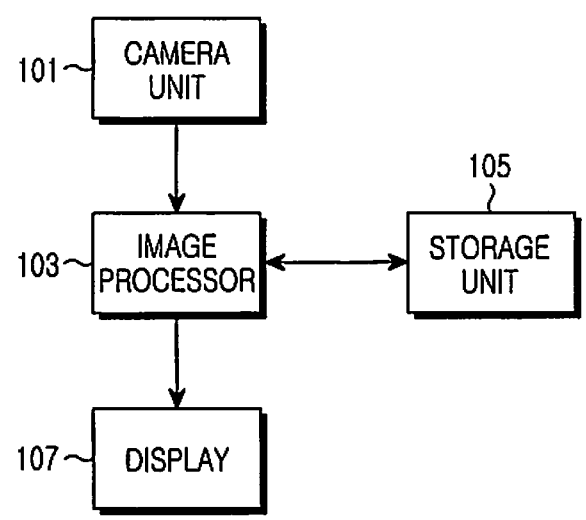
FIG. 1 is a block diagram illustrating an internal configuration of a digital image processing device for compensating for back light in an image according to an embodiment of the present invention.

FIG. 1 is a block diagram illustrating an internal configuration of a digital image processing device for compensating for a back light image according to an embodiment of the present invention.

Referring to FIG. 1, the digital image processing device includes a camera unit 101, an image processor 103, a storage unit 105, and a display 107.

The camera unit 101 takes a picture of a subject using at least one lens. The subject is photographed in the form of optical signals and the camera unit 101 transmits image signals corresponding to the photographed subject to the image processor 103. In this case, the image signals in the form of optical signals are converted into electric signals before transmission.

The image processor 103 converts the image signals received from the camera unit 101 into digital data and, upon receiving a back light image, compensates for the back light image. Whether or not the back light image is received may be confirmed by analyzing a distribution diagram of pixels included in a received image.

The storage unit 105 stores image signals received from the image processor 103 and may separately store back light images compensated for by the image processor 103. The display 107 outputs the image signals processed by the image processor 103. In this case, the images of which back light is processed by the image processor 103 are also output in real time.

For the detection of a back light image, whether an image input to the image processor 103 is a back light image is determined using a HIST parameter defined by Equation (1).

$$\text{HIST} = \text{(number of pixels less than threshold value)} / \text{(total number of pixels)} \quad (1)$$

Typically, all images received from a camera unit include a plurality of pixels and the HIST parameter is applied to the pixels included in the image. Each pixel value to which the HIST parameter is applied is compared with a threshold value, which is set according to ranges. The compared result may be expressed as an accumulated distribution function as illustrated in FIGS. 2A and 2B.

Figure 2A:
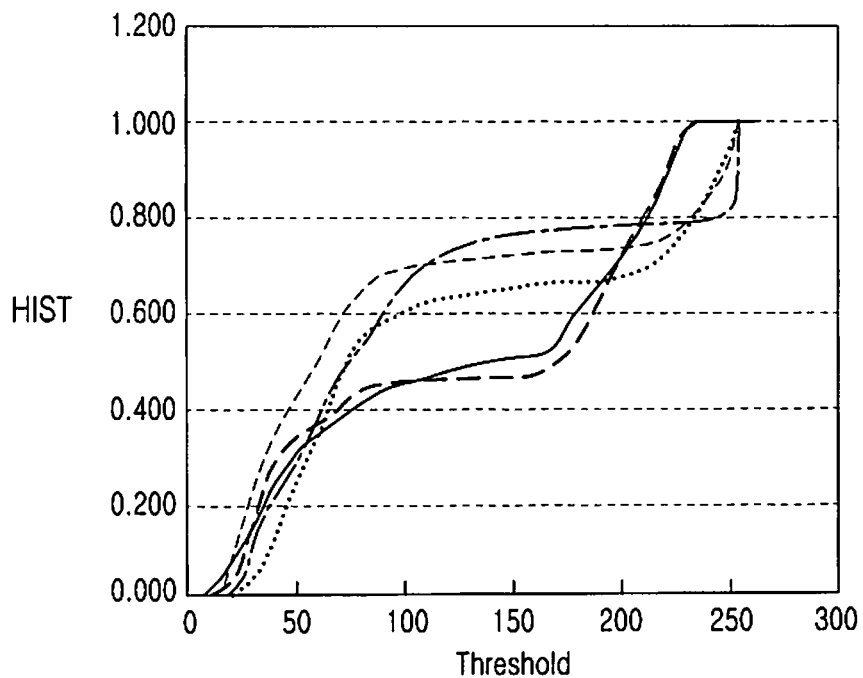
FIGS. 2A and 2B are graphs illustrating a distribution of pixels of images applying a HIST parameter according to an embodiment of the present invention.
Figure 2B:
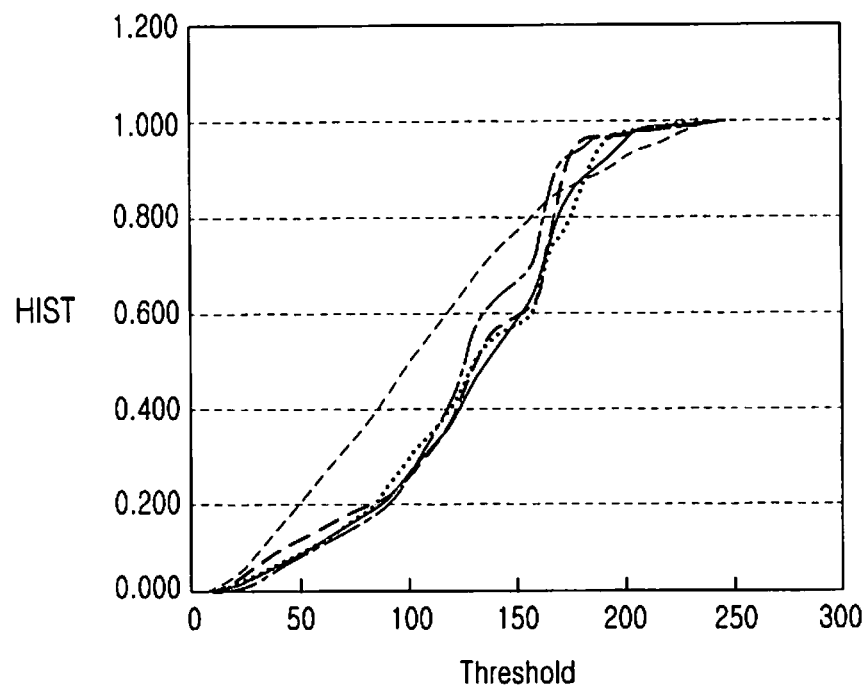

FIGS. 2A and 2B are graphs illustrating a distribution of pixels of images applying a HIST parameter according to an embodiment of the present invention. Specifically, FIG. 2A illustrates a distribution of pixels of back light images as HIST graphs and FIG. 2B illustrates a distribution of pixels of non-back light images as HIST graphs.

As illustrated in FIG. 2A, in the back light images, the slopes of the HIST graphs are comparatively gentle in middle ranges of input signals and are comparatively steep in start and end ranges thereof.

Referring to FIG. 2B, in the non-back light images, the slopes of the HIST graphs are generally constant irrespective of the middle, start or end range of input signals. This may be interpreted that many pixels having very high or very low temperature values among pixels included in the images are not distributed in those images.

The graphs of FIG. 2A may be interpreted that there are many pixels having very high or very low temperatures in the images due to the back light therein. A slope value Hdiff of a middle range of an input signal and a slope value Hedge of start and end ranges may be expressed by Equation (2).

$$H\text{diff} = \min[(H\text{hi} - H\text{mean}), (H\text{mean} - H\text{low})]$$

$$H\text{edge} = \min[h10, h90] \quad (2)$$

In Equation (2), Hmean denotes a mean value of total input pixels, Hhi denotes a value obtained by multiplying Hmean by 2, Hlow denotes a value obtained by multiplying Hmean by 0.5, h10 denotes a range including pixels included in the first 10 percent of a threshold value, and h90 denotes a range including pixels included in the last 10 percent of the threshold value. These parameters are illustrated in FIG. 3.

Figure 3:
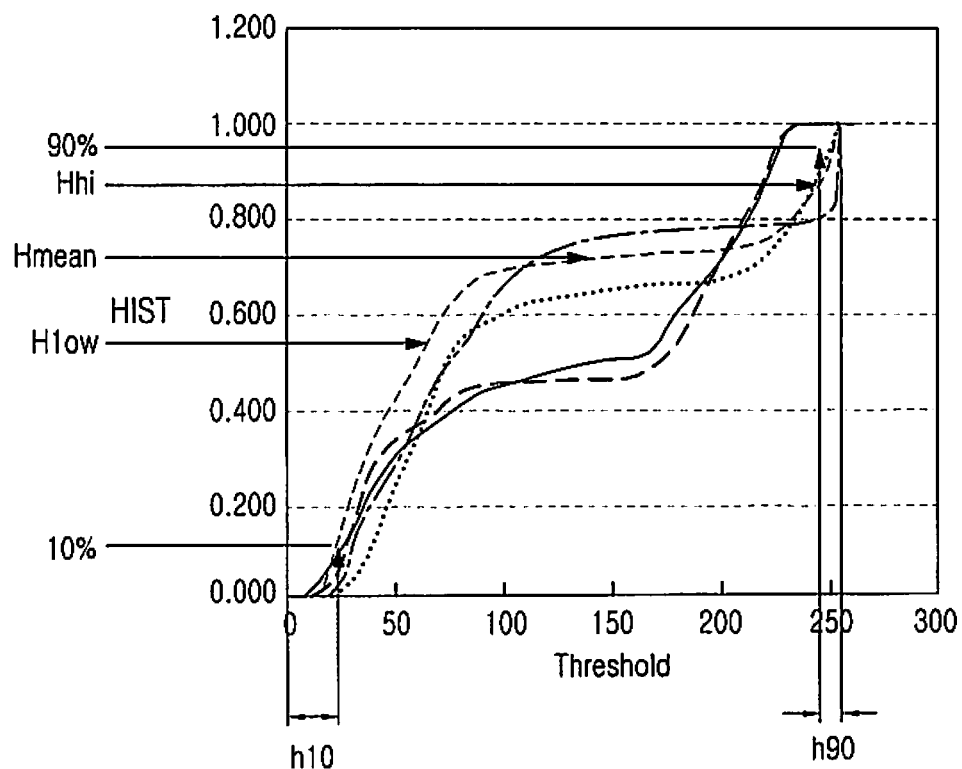
FIG. 3 is a graph illustrating parameters for obtaining slope values Hdiff Hedge of an input signal according to an embodiment of the present invention.

FIG. 3 is a graph illustrating parameters for obtaining slope values Hdiff and Hedge according to an embodiment of the present invention. The mean value Hmean of total input pixels may vary with each image. The high and low values Hhi and Hlow of input pixels may vary according to the means value Hmean. Although all pixels included in the range of h10 and h90 are determined in FIG. 3, h10 and h90 may be flexibly changed according to environments.

Figure 4:
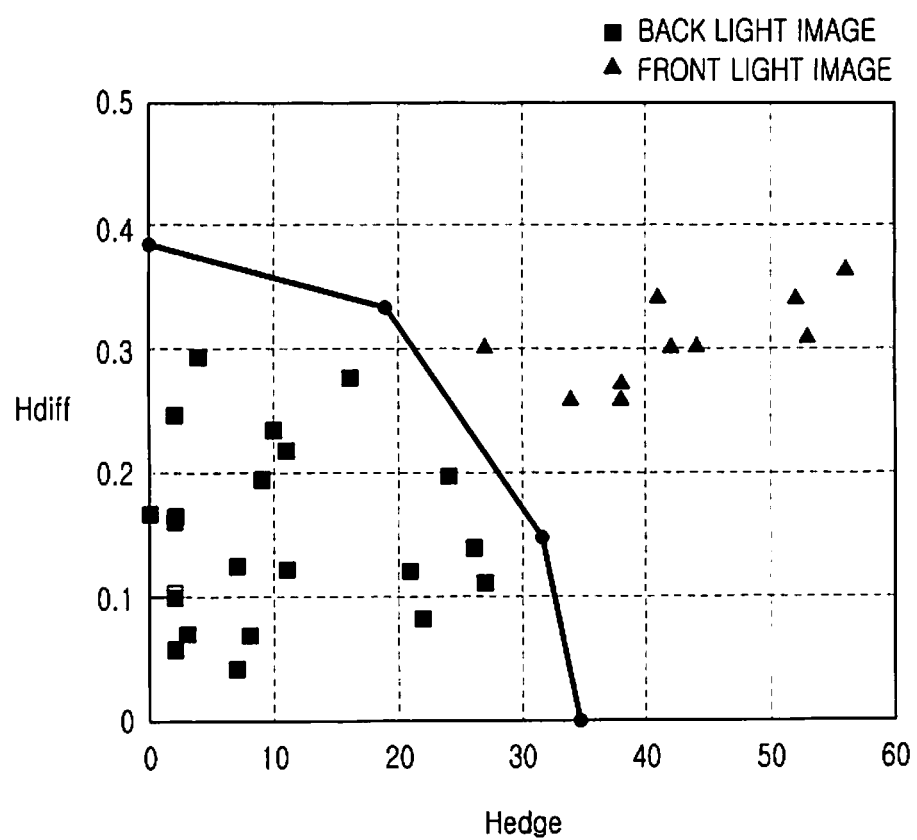
FIG. 4 is a graph illustrating a distribution of images using slope values Hdiff and Hedge according to an embodiment of the present invention.

FIG. 4 is a graph illustrating the distribution of images using the slope values Hdiff and Hedge according to an exemplary embodiment of the present invention. Specifically, FIG. 4 illustrates the distribution of received images when Hdiff and Hedge are arranged on a vertical axis and a horizontal axis, respectively.

Referring to FIG. 4, points formed within a boundary line are back light images received from the camera unit and points formed outside the boundary line are non-back light images. The back light images are distributed in an area near to the origin point. Accordingly, the image processor detects an image formed within the boundary line as a back light image. The boundary line may be preset or may be arbitrarily changed by a user of the digital image processing device according to used environments.

If a back light image is detected, the image processor of the digital image processing device determines a compensation value by analyzing the degree of a back light of the detected back light image. As illustrated in FIG. 4, as an image becomes nearer to the origin point of the Hdiff and Hedge graph, more compensation is demanded.

Figure 5:
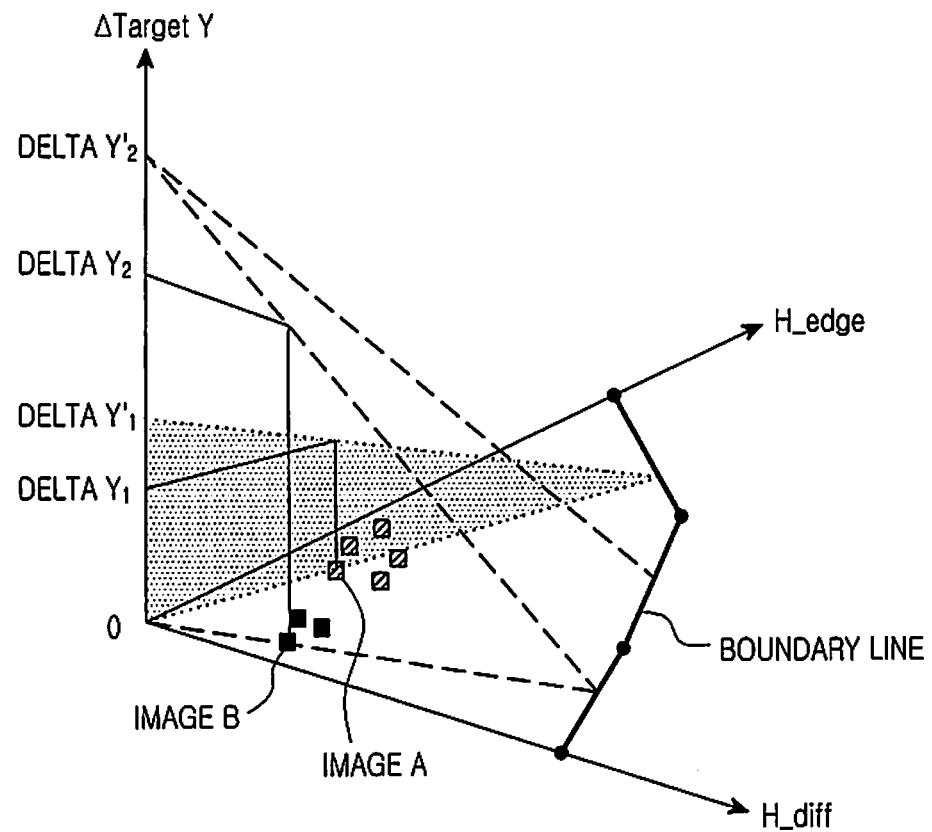
FIG. 5 is a diagram illustrating compensation value determination of a back light image according to an embodiment of the present invention.

FIG. 5 is a diagram illustrating compensation value determination of a back light image according to an embodiment of the present invention. Specifically, in FIG. 5, both compensation value determination of an image near to a boundary line and compensation value determination of an image near to an origin point are illustrated.

Referring to FIG. 5, to determine a compensation value, an axis of a target Y is used. The target Y is a value calculated by contributing input RGB signals in a prescribed ratio and refers to an average brightness value of an image that a user desires to determine. The target Y may be expressed as aR+bG+cB (where a, b, and c are constants). A final compensation value is determined by updating a delta Y, i.e., by adding a delta Y', which is a value to be compensated for, to the delta Y. The delta Y is determined by a function of a distance from an origin point in the Hedge and Hdiff graph and refers to a value determined arbitrarily by a user through statistical data. The delta Y is increased as an image is nearer to the origin point and is decreased as an image is farther from the origin point.

Referring to FIG. 5, because an image A is near to a boundary line, the brightness of the image A is compensated for by including an exposure value corresponding to a delta Y1' in a delta Y1. The delta Y1' is obtained as a final compensation value by connecting a point at which a value corresponding to a location of the image A and an average brightness value of the image A are met and a point at which an extension line of the location of the image A and a boundary line are met at a right angle, and connecting the connected point to the target Y axis.

Because an image B is nearer to the origin point than the image A, more compensation is performed. To compensate for the brightness of the image B, an exposure value of a delta Y2' should be added to a delta Y2. However, back light compensation is not completely performed only by the exposure value. Accordingly, only an exposure value corresponding to a value that does not generate excessive exposure should be added to the delta Y2, and the remaining part is compensated for using a gain that amplifies electric signals. However, even in this case, because the image generates noise by signal interference, a user may select whether to compensate for the image.

Figure 6:
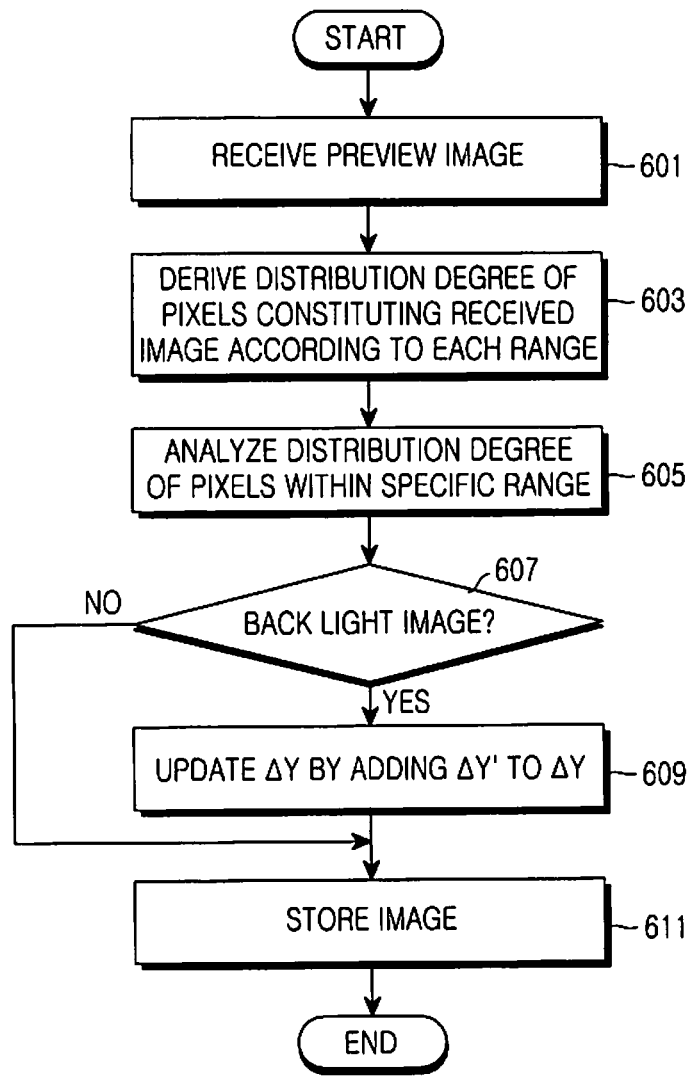
FIG. 6 is a flow chart illustrating a process for detecting and compensating for a back light image according to an embodiment of the present invention.

FIG. 6 is a flow char illustrating a process for detecting and compensating for a back light image according to an embodiment of the present invention.

Referring to FIG. 6, the image processor of the digital image processing device receives a preview image in step 601. The preview image is received in real time from the camera unit. The image processor obtains a HIST parameter according to pixels included in the received image and derives a distribution degree by applying the HIST parameter to a threshold value, which is divided according to each range, in step 603. The distributed degree may be expressed in the form of the HIST graph as illustrated in FIG. 2. As indicated in the graph, the slope of a back light image is different from the slope of a front light image.

The image processor analyzes the distribution degree of pixels corresponding to a specific range by calculating Hdiff and Hedge using Equation (2) in step 605. Hdiff refers to a slope value of a middle range of an input signal and Hedge refers to a slope value of start and end ranges of an input signal. As the slope value of Hdiff is gentle and the slope value of Hedge is steep, it is determined that an image includes severe back lighting.

The image processor determines whether an image includes back lighting by using the slope value of Hdiff and the slope value of Hedge in step 607. More specifically, the image processor determines whether an image is within a preset boundary line in a graph in which the slope of Hdiff is set as a vertical axis and the slope of Hedge is a horizontal axis. If an image is within the preset boundary line, the image is classified as a back light image, and if not, the image is classified as a non-back light image. If the image is classified as a non-back light image, because there is no need to perform compensation, the image is stored in step 611, without performing compensation.

If the image is classified as a back light image, the image processor proceeds determines a compensation value by adding the delta Y' determined by a compensation algorithm to the delta Y, in step 609. The compensation value is used to adjust brightness of an image by adding an exposure value of the delta Y'. In a severe back light image, a gain amplifying an electric signal may be used for compensation because there is a limit to compensation for the brightness of an image using only an exposure value. However, because compensation using the gain may deteriorate picture quality of an image, compensation using only the exposure value may be performed according to the selection of a user. In step 611, the image processor stores the compensated image in the storage unit.

Figure 7:
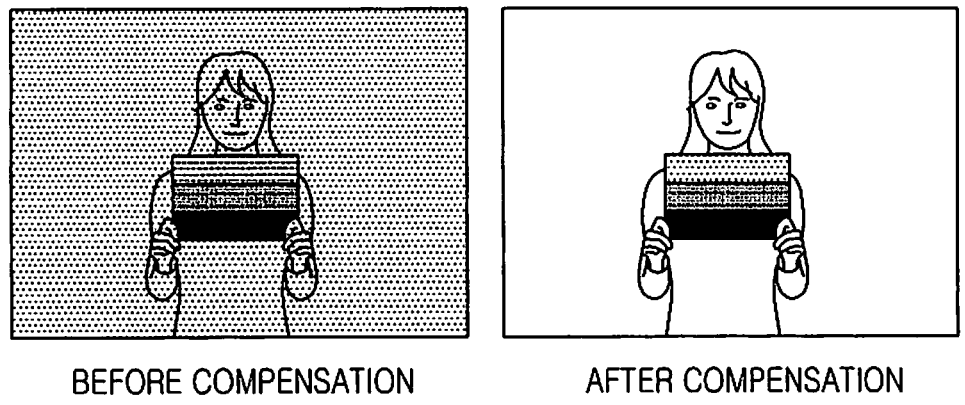
FIG. 7 is a diagram illustrating images before and after back light compensation according to an embodiment of the present invention.

FIG. 7 is a diagram illustrating an image before and after back light compensation according to an embodiment of the present invention.

Referring to FIG. 7, a face of a subject is dark and colors are not clear, before back light compensation. However, after the back light compensation, the face of the subject is brighter and colors are clearer. A user may confirm, in real time, a compensated image of the degree of back light of a received preview image and may photograph a better image.

According to the above-described embodiments of the present invention, because a back light image is compensated for by determining a degree of back light of a received image using a parameter, which is different from an existing algorithm, a more accurate compensation can be performed.

Although certain embodiments of the present invention have been disclosed above for illustrative purposes, various modifications, additions, and substitutions are possible, without departing from the scope and spirit of the invention as disclosed in the accompanying claims. Accordingly, the scope of the present invention should not be limited to the description of the embodiments provided above, but is defined by the accompanying claims and equivalents thereof.

What is claimed is:

1. An apparatus for compensating for back light, the apparatus comprising: a memory configured to store an image; and
   a processor configured to: divide pixels included in the image according to preset ranges, analyze a distribution degree of pixels in each of the preset ranges,
   determine whether the image is a back light image according to whether a slope value of a middle range of an input signal is gentle, and
   if the image is the back light image, adjust a brightness of the image.

2. The apparatus of claim 1, wherein adjusting the brightness of the image compensates the image and the processor is further configured to store the compensated image in the memory.

3. The apparatus of claim 1, wherein the processor is further configured to determine whether the image is the back light image by applying a HIST parameter to the pixels included in the image,
   wherein the HIST parameter is defined by:

HIST=(number of pixels less than threshold value)/(total number of pixels).

4. The apparatus of claim 3, wherein the HIST parameter is 1 when the threshold value is a maximum input value.

5. The apparatus of claim 1, wherein the pixels are divided into pixels having values within a specific range from among values of the pixels included in the image and pixels having values outside of the specific range.

6. The apparatus of claim 5, wherein the processor is further configured to calculate an accumulated distribution degree of the pixels having the values within the specific range and an accumulated distribution degree of the pixels having the values outside of the specific range, and determine whether the image is the back light image according to the calculated accumulated distribution degrees.

7. The apparatus of claim 6, wherein the accumulated distribution degrees are expressed by:

$H$diff=min[($H$hi−$H$mean), ($H$mean−$H$low)], and $H$edge=min[$h$10, $h$90], where Hdiff denotes the slope value of the middle range of the input signal, Hedge denotes the slope value of start and end ranges of the input signal, Hmean denotes a mean value of the pixels included in the image, Hhi denotes a value obtained by multiplying Hmean by 2, Hlow denotes a value obtained by multiplying Hmean by 0.5, h10 denotes a range including pixels included in the first 10 percent of a threshold value, and h90 denotes a range including pixels included in the last 10 percent of the threshold value.

8. The apparatus of claim 6, wherein the processor is further configured to determine that the image is the back light image, when the accumulated distribution degree of the pixels having the values outside of the specific range is greater, by a prescribed ratio, than the accumulated distribution degree of the pixels having the values within the specific range.

9. The apparatus of claim 1, wherein the processor is further configured to adjust the brightness of the back light image as an updated brightness value by adding a brightness value determined by a compensation algorithm to a preset brightness value of the back light image.

10. The apparatus of claim 9, wherein the compensation algorithm is configured to calculate a current brightness value of the back light image and compare the current brightness value of the back light image with a mean brightness value of the back light image to compensate for the calculated current brightness value of the back light image.

11. A method for compensating for back light of an image, the method comprising: dividing pixels included in the image according to preset ranges; analyzing a distribution degree of pixels in each of the preset ranges;
determining whether the image is a back light image according to whether a slope value of a middle range of an input signal is gentle; and
if the image is the back light image, adjusting a brightness of the image.

12. The method of claim 11, wherein adjusting the brightness compensates the image, and
the compensated image is stored.

13. The method of claim 11, wherein the pixels are divided into pixels having values within a specific range from among values of the pixels included in the image and pixels having values outside of the specific range.

14. The method of claim 13, wherein determining whether the image is the back light image comprises:
calculating an accumulated distribution degree of the pixels having values within the specific range and an accumulated distribution degree of the pixels having values outside of the specific range, and
determining whether the image is the back light image according to the distribution degrees.

15. The method of claim 14, wherein the image is determined as the back light image, when the accumulated distribution degree of the pixels having the values outside of the specific range is greater, by a prescribed ratio, than the accumulated distribution degree of the pixels having the values within the specific range.

16. The method of claim 11, wherein the brightness of the back light image is adjusted as an updated brightness value by adding a brightness value determined by a compensation algorithm to a preset brightness value of the back light image.

17. The method of claim 16, wherein the compensation algorithm is configured to calculate a current brightness value of the back light image and compare the current brightness value of the back light image with a mean brightness value of the back light image to compensate for the current brightness value of the back light image.

18. A back light compensating apparatus comprising:
a memory configured to store an image; and
a processor configured to:
divide pixels included in the image according to preset ranges,
analyze a distribution degree of pixels in each of the preset ranges,
determine whether the image is a back light image according to whether a slope value of a middle range of an input signal is gentle by applying a HIST parameter defined by a number of pixels less than a threshold value divided by a total number of pixels, and if the image is the back light image, adjust a brightness of the image.

19. A method for compensating for back light of an image, the method comprising: dividing pixels included in the image according to preset ranges; analyzing a distribution degree of pixels in each of the preset ranges;
determining whether the image is a back light image according to whether a slope value of a middle range of an input signal is gentle by applying a HIST parameter defined by a number of pixels less than a threshold value divided by a total number of pixels; and if the image is the back light image, adjusting a brightness of the image.

* * * * *